(12) United States Patent
Abbas et al.

(10) Patent No.: US 10,735,712 B2
(45) Date of Patent: *Aug. 4, 2020

(54) COMPACT ARRAY OF IMAGING DEVICES WITH SUPPLEMENTAL IMAGING UNIT

(71) Applicant: GoPro, Inc., San Mateo, CA (US)

(72) Inventors: Adeel Abbas, Carlsbad, CA (US); David A. Newman, San Diego, CA (US); Timothy Macmillan, La Honda, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/508,384

(22) Filed: Jul. 11, 2019

(65) Prior Publication Data

US 2019/0335159 A1    Oct. 31, 2019

Related U.S. Application Data

(63) Continuation of application No. 15/385,759, filed on Dec. 20, 2016, now Pat. No. 10,397,549.

(51) Int. Cl.
| | |
|---|---|
| *G06K 9/46* | (2006.01) |
| *G06T 7/33* | (2017.01) |
| *G06T 17/00* | (2006.01) |
| *G06T 7/292* | (2017.01) |
| *H04N 5/232* | (2006.01) |
| *H04N 5/247* | (2006.01) |

(Continued)

(52) U.S. Cl.
CPC ............. *H04N 13/243* (2018.05); *G01S 3/00* (2013.01); *G06K 9/209* (2013.01); *G06T 3/4038* (2013.01); *G06T 3/4053* (2013.01); *G06T 7/33* (2017.01); *G06T 17/00* (2013.01); *H04N 5/2258* (2013.01); *H04N 5/232* (2013.01); *H04N 5/247* (2013.01); *H04N 5/2624* (2013.01); *H04N 13/296* (2018.05); *G06K 2009/363* (2013.01); *G06T 2207/10028* (2013.01)

(58) Field of Classification Search
CPC .. H04N 13/243; H04N 13/296; H04N 5/2258; H04N 5/232; H04N 5/247; H04N 5/2624; G06T 7/33

See application file for complete search history.

(56) References Cited

U.S. PATENT DOCUMENTS 9,699,379 B1 *   7/2017  Baldwin ............ H04N 5/23238
9,729,857 B2 *   8/2017  Nisenzon ............... H04N 13/25
(Continued)

*Primary Examiner* — Obafemi O Sosanya
(74) *Attorney, Agent, or Firm* — Young Basile Hanlon & MacFarlane, P.C.

(57) ABSTRACT

A method and system are described. The method includes capturing a set of images from an array of cameras, each camera of the array of cameras having an overlapping field of view (FOV) with an adjacent camera of the array of cameras. The method further includes synchronously capturing a supplemental image from an additional camera, the additional camera having an at least partially overlapping FOV with every camera of the array of cameras. Supplemental information is extracted by comparing the supplemental image with the set of images. Portions of the set of images are stitched based in part on the supplemental information to produce a combined stitched image, the combined stitched image having a higher resolution than each image of the set of images.

20 Claims, 8 Drawing Sheets

(51) Int. Cl.
*H04N 13/243* (2018.01)
*H04N 13/296* (2018.01)
*G01S 3/00* (2006.01)
*G06K 9/20* (2006.01)
*G06T 3/40* (2006.01)
*H04N 5/225* (2006.01)
*H04N 5/262* (2006.01)
*G06K 9/36* (2006.01)

(56) References Cited

U.S. PATENT DOCUMENTS

2002/0122113 A1* 9/2002 Foote ................ G06T 3/4038
  348/48
2017/0353670 A1* 12/2017 Zimmer ............... H04N 5/247

* cited by examiner

COMPACT ARRAY OF IMAGING DEVICES WITH SUPPLEMENTAL IMAGING UNIT

CROSS-REFERENCE TO RELATED APPLICATION(S)

This application is a continuation of U.S. patent application Ser. No. 15/385,759, filed Dec. 20, 2016, the entire disclosure of which is hereby incorporated by reference.

BACKGROUND

1. Field of Art

The disclosure generally relates to the field of imaging devices, and more particularly to an array of imaging devices with a supplemental imaging unit for improved image quality and functionality.

2. Description of the Related Art

New media formats and consumption paradigms have located a demand on imaging technology to develop higher fidelity imaging techniques that can provide more information about the environment captured by the imaging device. For example, the resolution requirements for captured images are increased to accommodate for applications such as virtual reality or wide field of view applications. However, these imaging devices may need to be contained in compact housings, such as within smartphones. These compact housing may not have sufficient depth to allow for a traditional camera with lens assembly that can support the enhanced features such as increased resolution. Hence, there is a need for an imaging device capable of producing high resolution and enhanced images with a compact form factor.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein. For example, one can build a 4×4 or 8×8 camera array by using the same method that is described herein.

Exemplary Camera Array System

Figure 1A:
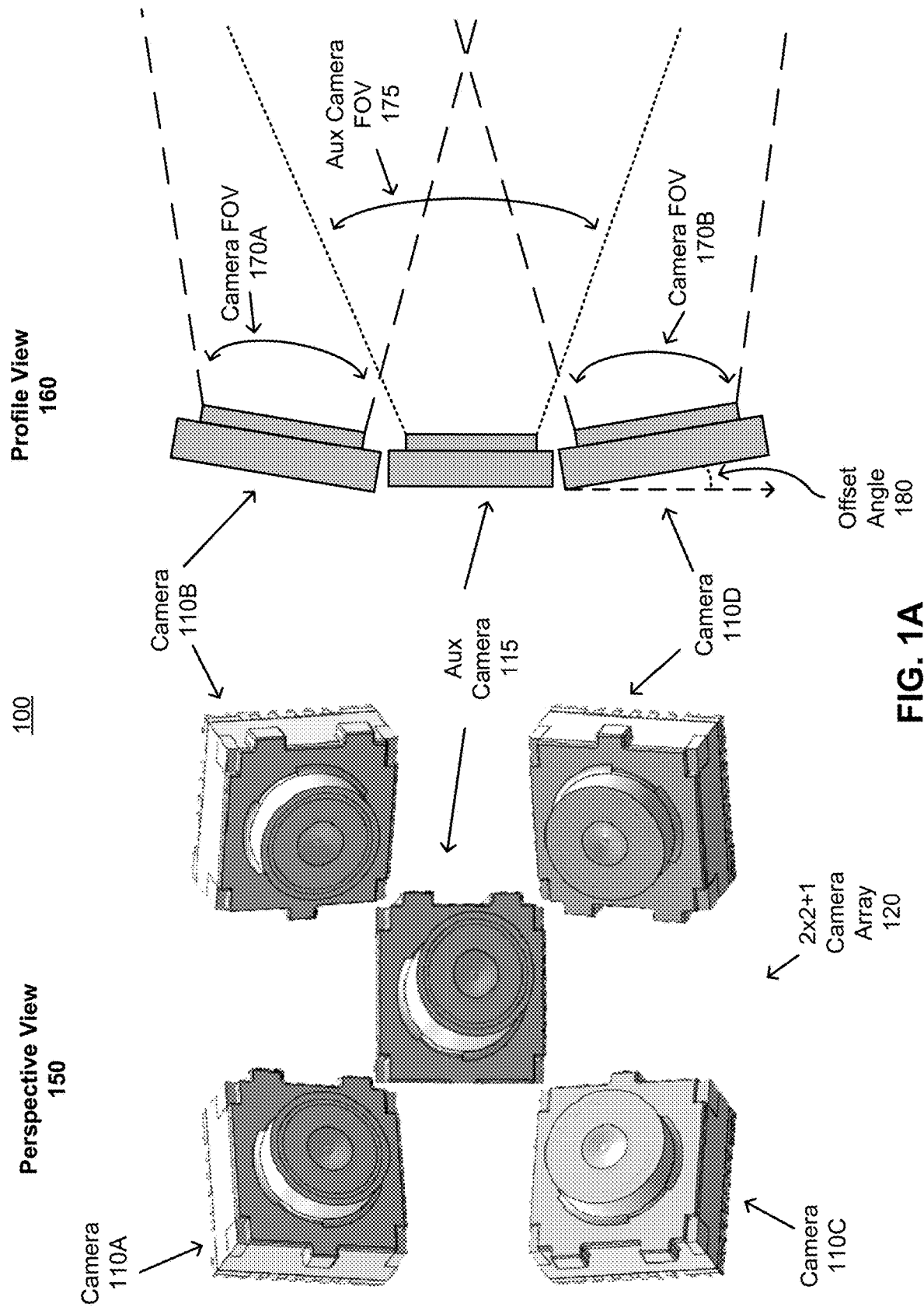
FIG. 1A illustrates a 2×2+1 camera array arranged according to one embodiment of the configurations described herein.
Figure 1B:
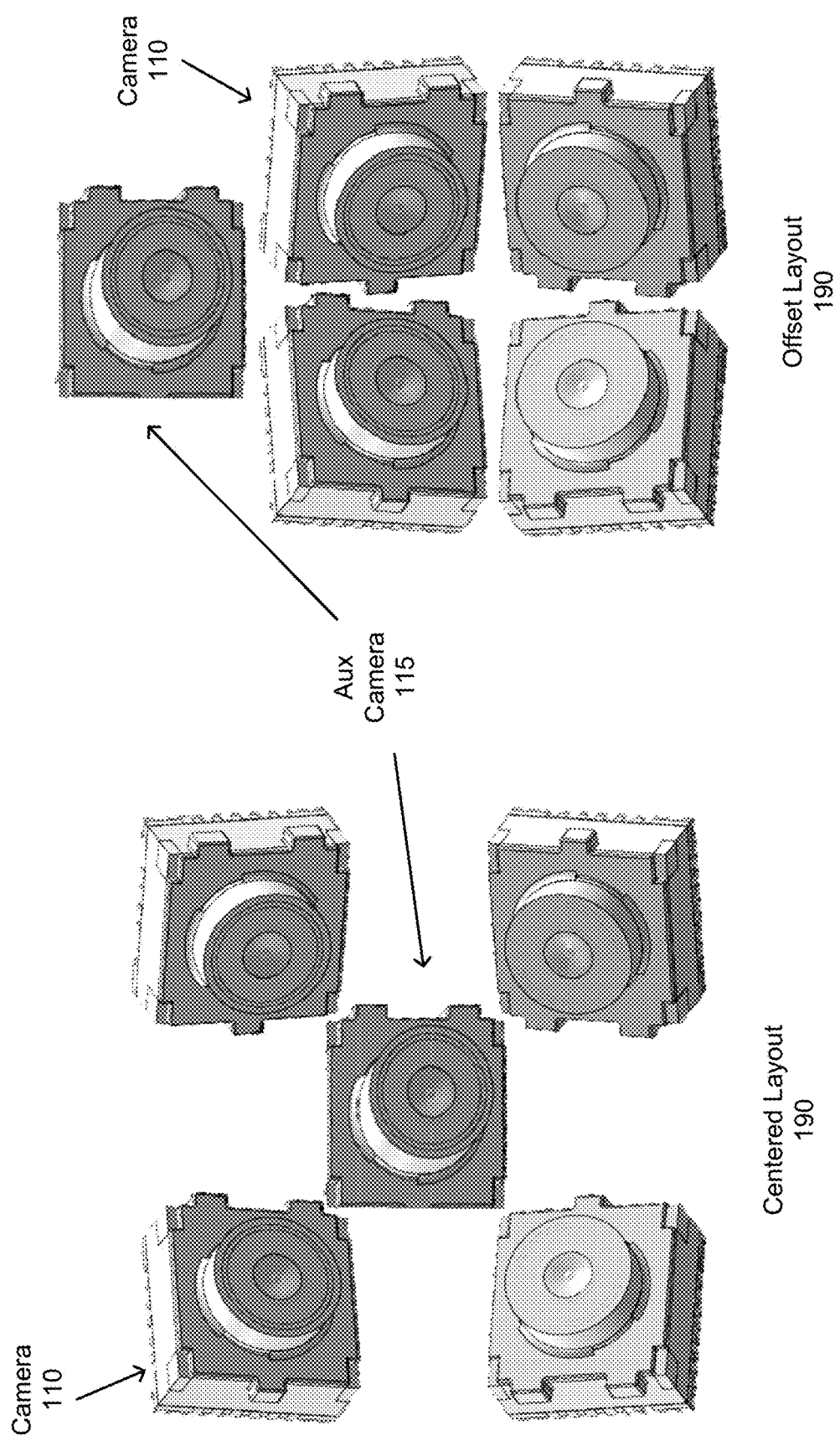
FIG. 1B illustrates an alternative arrangement of the 2×2+1 camera array 120 according to one embodiment

FIG. 1A illustrates a 2×2+1 camera array 120 arranged according to one embodiment of the configurations described herein. The 2×2+1 camera array 120 is shown in both a perspective view 150 and a profile view 160 (or cross-sectional view). FIG. 1B illustrates an alternative arrangement of the 2×2+1 camera array 120 according to one embodiment.

The 2×2+1 camera array 120 (hereinafter "camera array 120") includes four cameras 110A, 110B, 110C, and 110D (the cameras 110) positioned in a 2×2 array. Each camera has a roll rotation, a pitch rotation, and a yaw rotation, with the rotations minimizing distance between centers of the lenses, such that the field of views (FOVs) of each camera has at least some overlap, for example an overlap of 10 degrees between images of any two cameras. The cameras 110 are further rotated such that the shared FOV of all four cameras exceeds the individual FOVs of each camera 110, for example, by a factor of three or more. This may be achieved by rotating each camera to be at an angle relative to a reference plane (i.e., the plane on which the cameras 110 would be located on if they were not rotated), such as with the offset angle 180. Thus, the combined FOV of the four cameras 110 is greater than the individual FOVs of each individual camera 110.

The cameras 110A-D in the illustrated camera array 120 each capture an angled image of a combined FOV of the camera array 120. Thus, each camera 110 captures a portion of the combined FOV of the camera array 120. For example, as illustrated in the perspective view 150 of FIG. 1, each camera 110 is located at one corner of a square/rectangular boundary, and each camera 110 captures an FOV that is at the corner at which the camera 110 is located, and which is a portion of the combined FOV of the camera array 120. Note that because the cameras are angled, the images captured from each camera 110 are also angled, and the FOVs of each camera are not parallel. For example, as illustrated in the profile view 160, the cameras 110 have camera FOVs 170 (e.g., camera FOVs 170A-B) which overlap with each other.

Additionally, adjacent to the four cameras 110 is an auxiliary camera ("aux camera"). The aux camera 115 may be located centrally between the four cameras 110 and equidistant to each of the four cameras 110. The FOV of the aux camera 115 overlaps with the FOVs of each of the four cameras 110, and this overlap may be over at least a certain percentage (e.g., 50%) of the FOV of each of the four cameras 110. Thus, the aux camera 115 may not be rotated from the aforementioned flat plane. As illustrated in FIG. 1B, in addition to the centered layout 190 illustrated in FIG. 1A and shown again in FIG. 1B, the aux camera 115 may also be located adjacent to the four cameras 110 in an offset layout 190. In the offset layout 190, the four cameras 110 are equidistant from each other and arranged in a grid pattern, but unlike in the centered layout 190, the aux camera 115 is located offset from the four cameras 110 and is not equidistant from each of the four cameras 110. The distance of the aux camera 115 to the four cameras 115 (e.g., to the nearest one of the four cameras 110) may be the same as the distance of one of the four cameras 110 to an adjacent (e.g., a non-diagonally adjacent) camera 110. The distance may be such that the FOV of the aux camera 115 overlaps with at least a certain percentage (e.g., 50%) of the FOV of each of the four cameras 110.

In one embodiment, the aux camera 115 captures signals (e.g., photons) in the visible spectrum. The captured information may be used, for example, to determine depth information regarding a scene captured by the camera array 120 (e.g., via stereophotogrammetry). In another embodiment, the aux camera 115 captures signals outside of the visible spectrum, such as in the infrared spectrum. In one embodiment, the aux camera 115 may capture the direction from which a photon was captured. In one embodiment, the aux camera 115 additionally outputs signals along the electromagnetic spectrum. These signals may be directed towards the FOV of the aux camera 115. These signals may be of visible or non-visible spectrum electromagnetic radiation, may be structured (e.g., structured light), coherent, or of any other format. The aux camera 115 may be able to capture the output signals as returned signals (e.g., reflected light). These various features may allow the aux camera 115 to provide additional information about a captured scene, such as depth information, light field information, and so on. The aux camera 115, however, may be of lower resolution (e.g., not have a large number of photosites on its imaging sensor), in comparison to each of the cameras 110. For example, each camera 110 may support a 4K video resolution, while the aux camera 115 may only support 1080p video resolution. However, the lower resolution of the aux camera 115 can be sufficient for determining the depth of the scene captured by the aux camera 115 with sufficient detail.

In one embodiment, the aux camera 115 is used to display a live feed when the stitching of the image captured by the cameras 110 cannot be performed in real time due to resource restrictions, such as processing power restrictions, battery power restrictions, etc.

Additional details regarding various exemplary functions of the camera array 120 with the aux camera 115 are described below with reference to FIGS. 2-7.

The camera array 120 can be adapted to be at least partially enclosed by a protective camera housing (not illustrated here). In one embodiment, the camera array 120 and/or housing of the array 120 has a small form factor (e.g., a height of approximately 1 to 6 centimeters, a width of approximately 1 to 6 centimeters, and a depth of approximately 1 to 2 centimeters), and is lightweight (e.g., approximately 50 to 150 grams). The housing and/or camera bodies can be rigid (or substantially rigid) (e.g., plastic, metal, fiberglass, etc.) or pliable (or substantially pliable) (e.g., leather, vinyl, neoprene, etc.). In one embodiment, the housing and/or the array may be appropriately configured for use in various elements. For example, the housing may include a waterproof enclosure that protects the camera array 120 from water when used, for example, while surfing or scuba diving. As another example, the camera array 120 may be located within a smartphone. In some embodiments, such as those described below, the camera array 120 can be secured within a protective multiple camera array module, which in turn can be secured within a camera body in one or more orientations.

Portions of the aforementioned housing and/or array may include exposed areas to allow a user to manipulate buttons that are associated with the camera array 120 functionality (e.g., to take a photo, to record video, to adjust imaging parameters). Alternatively, such areas may be covered with a pliable material to allow the user to manipulate the buttons through the housing. For example, in one embodiment the top face of the housing includes an outer shutter button structured so that a shutter button of the camera array 120 is substantially aligned with the outer shutter button when the camera array 120 is secured within the housing. The shutter button of the camera array 120 is operationally coupled to the outer shutter button so that pressing the outer shutter button allows the user to operate the camera shutter button.

In one embodiment, the front face of the housing includes one or more lens windows structured so that the lenses of the cameras in the camera array 120 are substantially aligned with the lens windows when the camera array 120 is secured within the housing. The lens windows can be adapted for use with a conventional lens, a wide angle lens, a flat lens, or any other specialized camera lens. In one embodiment, the lens window includes a waterproof seal so as to maintain the waterproof aspect of the housing.

In one embodiment, the housing and/or array includes one or more securing structures for securing the housing and/or array to one of a variety of mounting devices. For example, various mounts include a clip-style mount or a different type of mounting structure via a different type of coupling mechanism.

In one embodiment, the housing includes an indicator window structured so that one or more camera array indicators (e.g., a recording indicator) are substantially aligned with the indicator window when the camera array 120 is secured within the housing. The indicator window can be any shape or size, and can be made of the same material as the remainder of the housing, or can be made of any other material, for instance a transparent or translucent material and/or a non-reflective material.

The housing can include a first housing portion and a second housing portion, according to one example embodiment. The second housing portion detachably couples with the first housing portion opposite the front face of the first housing portion. The first housing portion and second housing portion are collectively structured to enclose a camera array 120 within the cavity formed when the second housing portion is secured to the first housing portion in a closed position.

The camera array 120 is configured to capture images and video, and to store captured images and video for subsequent display or playback. The camera array 120 is adapted to fit within a housing, such as the housing discussed above or any other suitable housing. Each camera 110 in the camera array 120 can be an interchangeable camera module. As illustrated, the camera array 120 includes a plurality of lenses configured to receive light incident upon the lenses and to direct received light onto image sensors internal to the lenses.

The camera array 120 can include various indicators, including LED lights and a LED display. The camera array 120 can also include buttons configured to allow a user of the camera array 120 to interact with the camera array 120, to turn on the camera array 120, and to otherwise configure the operating mode of the camera array 120. The camera array 120 can also include a microphone configured to receive and record audio signals in conjunction with recording video. The camera array 120 can include a physical I/O interface. The I/O interface can be enclosed by a protective door and/or include any type or number of I/O ports or mechanisms, such as USC ports, HDMI ports, memory card slots, and the like.

The camera array 120 can also include a door that covers a removable battery and battery interface. The camera array 120 can also include an expansion pack interface configured to receive a removable expansion pack, such as a display module, an extra battery module, a wireless module, and the like. Removable expansion packs, when coupled to the camera array 120, provide additional functionality to the camera array 120 via the expansion pack interface.

Note that while the description here is made primarily in regards to a 2×2 camera array 120, in other embodiments the camera array 120 may include more than the number of cameras indicated here. For example, the camera array 120 may include a 4×4 array of cameras, or an 8×8 array. Not only are the individual cameras 110 scaled up in number, but the aux camera 115 may also be scaled up in number. Furthermore, the multiple aux cameras may be simultaneously placed both at the center and offset from the camera array 120, e.g., as shown in FIG. 1B.

Figure 2:
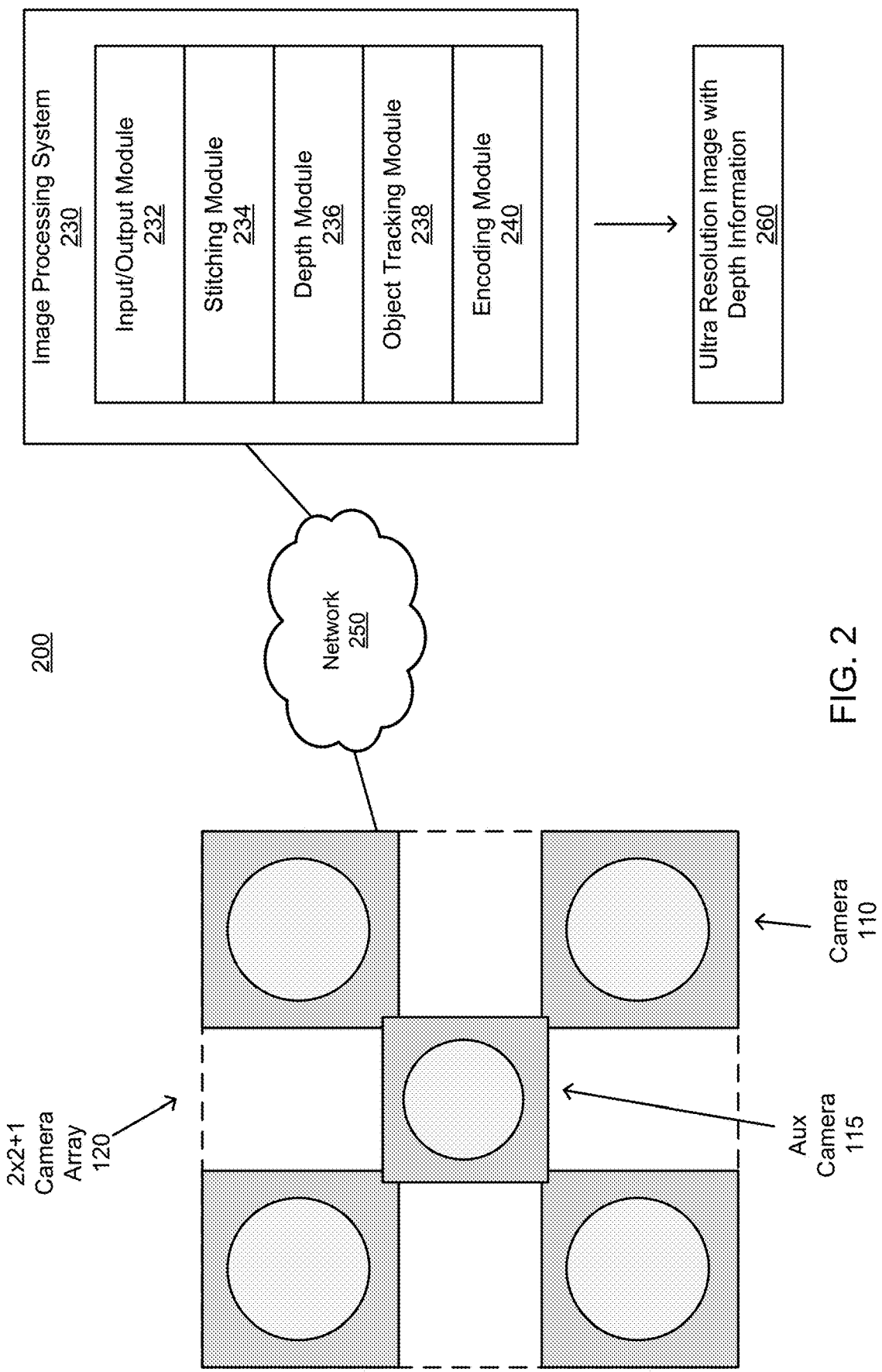
FIG. 2 illustrates an exemplary environment including the camera array and an image processing system connectively coupled via network, according to one embodiment.

FIG. 2 illustrates an exemplary environment 200 including the camera array 120 and an image processing system 230 connectively coupled via network 250, according to one embodiment.

The network 250 represents the communication pathways between the camera array 120 and the image processing system 230. In one embodiment, the network 250 is the Internet, but may also be any other network, including but not limited to a LAN, a MAN, a WAN, a mobile, wired or wireless network, a cloud computing network, a private network, a virtual private network, and any combination thereof. The network 250 may also be an internal network within a device, such as a local message bus or serial communications network. In addition, all or some of links of the network 250 can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The image processing system 230 processes the images captured by the camera array 120. Although the image processing system 230 is shown in FIG. 2 to be separated from the camera array 120, in other embodiments some of the modules (e.g., the input/output module 232) or the entire image processing system 230 is contained within, included with, or coupled within a single unit with the camera array 120. The image processing system 230 includes an input/output (I/O) module 232, a stitching module 234, a depth module 236, an object tracking module 238, and/or an encoding module 240.

The I/O module 232 receives input, e.g., captured images and/or videos, from the camera array 120 and transmits output, e.g., commands, to the camera array 120. In one embodiment an I/O module 232 may be coupled with each one of the cameras 110 and with the aux camera 115. The I/O module 232 may receive the captured image data from the camera array 120 as raw data, i.e., raw subpixel values, or may receive the captured image data in a pre-processed format. For example, the received image data may have already been encoded, compressed, mapped, or otherwise modified from the raw values.

The I/O module 232 may simultaneously receive data from each camera in the camera array 120, or may receive data serially from the cameras in the camera array 120. The I/O module 232 may receive the data from the camera array 120 in batch, or may receive the data in real-time (or substantially in real-time). For example, the camera array 120 may capture images at a high rate (e.g., 30 frames per second) to allow for the later generation of a video based on the captured images. The I/O module 232 may in this case receive these captured images at this high rate in real-time. In one embodiment, the I/O module 232 transmits a synchronization signal to the cameras in the camera array 120. This signal allows the cameras in the camera array 120 (and the aux camera 115) to capture images at the same time (or substantially the same time). The synchronization signal may also transmit other information to the cameras in the camera array 120 to allow them to capture images or video at with identical or similar settings. For example, the synchronization signal may transmit focus, metering, zoom, aperture, shutter speed, and other settings to each of the cameras in the camera array 120.

The stitching module 234 stitches or combines the images captured by the cameras 110 of the camera array 120 into a single image, which may have improved resolution, detail, dynamic range, and other features exceeding that of the individual cameras 110. The stitching module 234 may also use the information captured by the aux camera 115 to improve the quality of the stitching operation as well as to provide additional information about a captured scene.

The stitching module 234 performs various image manipulation operations in order to convert the four images captured by the four cameras 110 into a single image. The stitching may match elements in the individual images captured by the four cameras 110 and align these portions using various image analysis techniques, such as edge detection, object detection, depth estimation, and computational photography, etc. The stitching module 234 performs further image manipulation techniques, such as warping, skewing, resizing, and other appropriate methods in order to convert the aligned images into a single image.

The stitching module 234 may further utilize the information gathered by the aux camera 115. In one embodiment, the aux camera 115 captures depth information about a scene. Using the depth information, the stitching module 234 may be able to better align the four images captured from the four cameras 110 and produce an improved stitched image with fewer or no visual artifacts due to the stitching operation. This allows the stitching module 234 to produce a single composite high resolution image from the four separate images that is of a higher resolution than the four images used to create it, using a camera array that may be smaller, more lightweight, and less expensive than a comparable single camera that would be able to produce the same quality high resolution image.

Additional details regarding the stitching module 234 are described below with regards to FIGS. 3-7.

The depth module 236 uses depth information captured by the aux camera 115 to generate three dimensional (3D) information for the scene captured by the camera array 120. As noted above, the FOV captured by the aux camera 115 can overlap substantially (e.g., over 50%) with the combined FOV captured by the four cameras 110 of the camera array 120. Using the depth information from the aux camera 115, the depth module 236 is able to reconstruct a 3D view of the scene captured from the cameras 110. The image captured from the cameras 110 may be overlaid over the reconstructed 3D view in order to create a textured 3D view of the captured scene. Since the scene is not captured from all angles, the 3D view and applied textures are limited to certain viewing angles, but in contrast to a 2D image the textured 3D reconstruction can be viewed from a limited range of viewing angles rather than only one static viewing angle. These 3D views, may, for example, be used in a virtual reality (VR) application. For example, the captured images or videos with 3D reconstruction may be transmitted to a VR headset to allow the user to view a captured scene in 3D.

Additional details regarding the depth module 236 are described below with regards to FIGS. 3-7.

The object tracking module 238 is capable of using the aux camera 115 to track objects in the scene captured by the camera array 120. The object tracking module 238 may in particular track moving objects, for example, in order to determine the z-order of objects in the scene (i.e., which objects are behind or in front of other objects). The determination of which objects lie behind others may be used to augment the image stitching process performed by the stitching module 232 as described above. For example, when the camera array 120 is capturing a video (i.e., a series of images), the alignment of objects in the captured images from the cameras 110 may become difficult when fast moving objects for which only a few frames are captured move across the FOV of the camera array 120. For example, if multiple athletes run across a scene quickly and in a visually tight group, with athletes changing depth position quickly over short numbers of frames, the stitching module 234 may have difficulty using traditional image analysis techniques to properly align the images from the four cameras 110. In these and similar case, the object tracking module 238 may use the depth information received from the aux camera 115 to determine the locations of objects moving in the scene in order to provide additional information about where these objects are relative to each other. This may allow the stitching module 234 to distinguish different objects and perform a better stitching operation with less visual artefacts.

The object tracking module 238 may also track objects for other purposes, such as being able to quickly track a moving object in order to lock focus on that object, or for use in an electronic image stabilization process.

The encoding module 240 encodes the captured images from the camera array 120 in a particular format for transport. In one embodiment, the encoding module 240 encodes the captured images from the individual cameras of the camera array 120 before stitching has occurred. In one embodiment, the encoding module 240 encodes the complete stitched image from the camera array 120. Various encoding techniques and arrangements of the projection may result in different encoding artifacts and/or efficiencies. The encoding module 240 may encode the images using a particular encoding technique (e.g., H. 264), encoding settings (e.g., average bit rate settings), and/or arrangement of the projection of the alternative representation (or the original images) in order to achieve a certain level of efficiency (e.g., storage size) and/or a certain quality level (e.g., SNR level or artifact level).

As a result, the image processing system may produce an ultra-resolution image 260 with depth information. By using the camera array 120 and the stitching process, a high resolution image with depth/3D information, normally only produced using a high end, large, heavy, and expensive camera, may instead be produced from a camera array that includes a number of smaller, less expensive, and lighter weight cameras. This has many potential advantages. For example, such a camera array 120 may easily be included in a small and lightweight form factor electronic device, such as an action camera, or a smartphone, etc., and be used to capture high quality images. As these devices are consumer-facing products, manufacturing costs are a major factor in determining commercial viability, and the lowered cost of the camera array 120 reduces the overall cost of the device. Note that although four cameras 110 are described here for the camera array 120, in other embodiments the camera array 120 may include more or less than the four cameras 110 described here, with each camera sharing a portion of the FOV.

Example Camera Configuration

Figure 3:
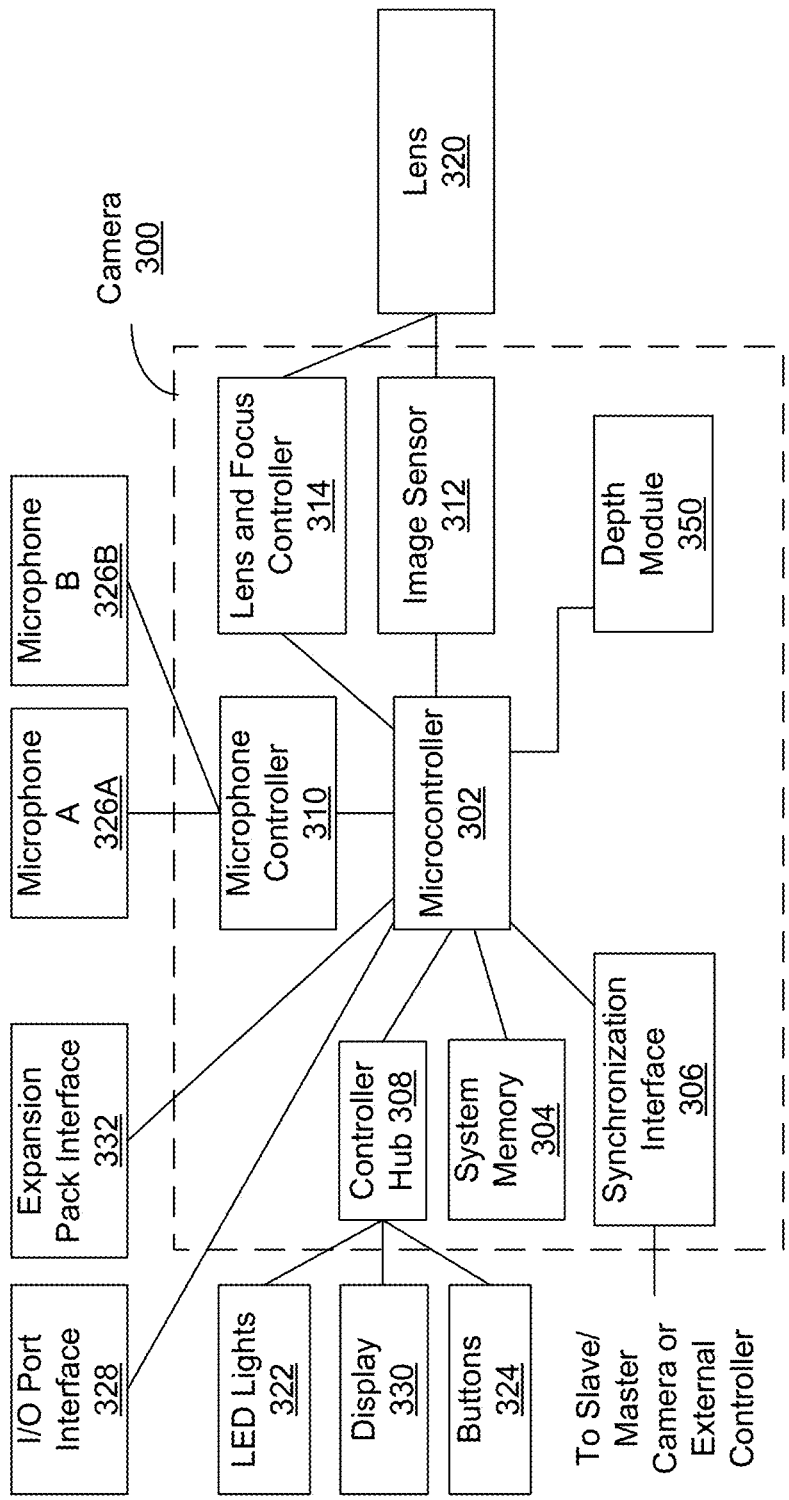
FIG. 3 is a block diagram illustrating electronic components of a camera, according to one embodiment.

FIG. 3 is a block diagram illustrating electronic components of a camera 300, according to one embodiment. The camera 300 of the embodiment of FIG. 2 includes one or more microcontrollers 302, a system memory 304, a synchronization interface 306, a controller hub 308, one or more microphone controllers 310, an image sensor 312, a focus controller 314, one or more lenses 320, one or more LED lights 322, one or more buttons 324, one or more microphones 326, an I/O port interface 328, a display 330, an expansion pack interface 332, and a depth module 350. In one embodiment, the camera 300 may be one of the cameras 110 or the aux camera 115.

The camera 300 includes one or more microcontrollers 302 (such as a processor) that control the operation and functionality of the camera 300. For instance, the microcontrollers 302 can execute computer instructions stored on the memory 304 to perform the functionality described herein. It should be noted that although lookup table (LUT) generation and color model conversion are described herein as performed by the camera 300, in practice, the camera 300 can capture image data, can provide the image data to an external system (such as a computer, a mobile phone, or another camera), and the external system can generate a LUT based on the captured image data.

A lens and focus controller 314 is configured to control the operation, configuration, and focus of the camera lens 320, for instance based on user input or based on analysis of captured image data. The image sensor 312 is a device capable of electronically capturing light incident on the image sensor 312 and converting the captured light to image data. The image sensor 312 can be a complementary metal oxide semiconductor (CMOS) sensor, a charged coupled device (CCD) sensor, or any other suitable type of image sensor, and can include corresponding transistors, photodiodes, amplifiers, analog-to-digital converters, and power supplies. In one embodiment, the image sensor 312 includes a Bayer color filter array.

The lens 320 may include a spherical, parabolic, Fresnel, or other type of curved lens(es) composed of optically transparent material such as glass, transparent plastic polymers, which are capable of changing the path of arriving light and align this light to be collected by the image sensor 312.

A system memory 304 is configured to store executable computer instructions that, when executed by the microcontroller 302, perform the camera functionalities described herein. The system memory 304 also stores images captured using the lens 320 and image sensor 312. The memory 304 can include volatile memory (e.g., random access memory (RAM)), non-volatile memory (e.g., a flash memory), or a combination thereof. In one embodiment, the system memory 304 includes executable code that when executed by the microcontroller 302 perform the functions of one or more of the modules of the image processing system 130.

A synchronization interface 306 is configured to communicatively couple the camera 300 with external devices, such as a remote control, another camera (such as a slave camera or master camera, e.g., other cameras 110), a computer, or a smartphone. The synchronization interface 306 may transfer information through a network, which allows coupled devices, including the camera 300, to exchange data other over local-area or wide-area networks. The network may contain a combination of wired or wireless technology and make use of various connection standards and protocols, such as Wi-Fi, IEEE 3394, Ethernet, 802.11, 4G, or Bluetooth.

A controller hub 308 transmits and receives information from user I/O components. In one embodiment, the controller hub 308 interfaces with the LED lights 322, the display 330, and the buttons 324. However, the controller hub 308 can interface with any conventional user I/O component or components. For example, the controller hub 308 may send information to other user I/O components, such as a speaker.

A microphone controller 310 receives and captures audio signals from one or more microphones, such as microphone 326A and microphone 326B. Although the embodiment of FIG. 1 illustrates two microphones, in practice, the camera can include any number of microphones. The microphone controller 310 is configured to control the operation of the microphones 326. In some embodiments, the microphone controller 310 selects which microphones from which audio data is captured. For instance, for a camera 300 with multiple microphone pairs, the microphone controller 310 selects one microphone of the pair to capture audio data. Multiple microphones may also be configured together for a separate function, e.g., in order to capture audio signals while cancelling out background noise.

In one embodiment, the camera 110 includes a depth module 350. The depth module may be capable of outputting electromagnetic (EM) radiation for the purposes of depth sensing. This radiation may include a structured light output, coherent light output (e.g., an infrared laser), infrared radiation output, and so on. The depth module 350 may determine depth information for locations in a captured scene using data reflected back from the output EM radiation. For example, using infrared radiation, the depth module 350 may determine the intensity of the return infrared radiation received at the image sensor 312 as a reflection from objects in the FOV of the camera 300. This may be used to determine depth information. Alternatively, the depth module 350 may have a separate sensor which is able to determine the time of flight for output EM radiation in order to measure the distance from the camera 300 to different objects in the scene. As yet another example, the depth module 350 may output a structured light pattern (e.g., in a non-visible spectrum) and determine using the captured pattern (e.g., by the image sensor 312 that is sensitive to the non-visible spectrum) the depth of objects in the FOV of the camera 300.

Additional components connected to the microcontroller 302 include an I/O port interface 328 and an expansion pack interface 332. The I/O port interface 328 may facilitate the camera 300 in receiving or transmitting video or audio information through an I/O port. Examples of I/O ports or interfaces include USB ports, HDMI ports, Ethernet ports, audio ports, and the like. Furthermore, embodiments of the I/O port interface 328 may include wireless ports that can accommodate wireless connections. Examples of wireless ports include Bluetooth, Wireless USB, Near Field Communication (NFC), and the like. The expansion pack interface 332 is configured to interface with camera add-ons and removable expansion packs, such as an extra battery module, a wireless module, and the like.

Exemplary FOV

Figure 4:
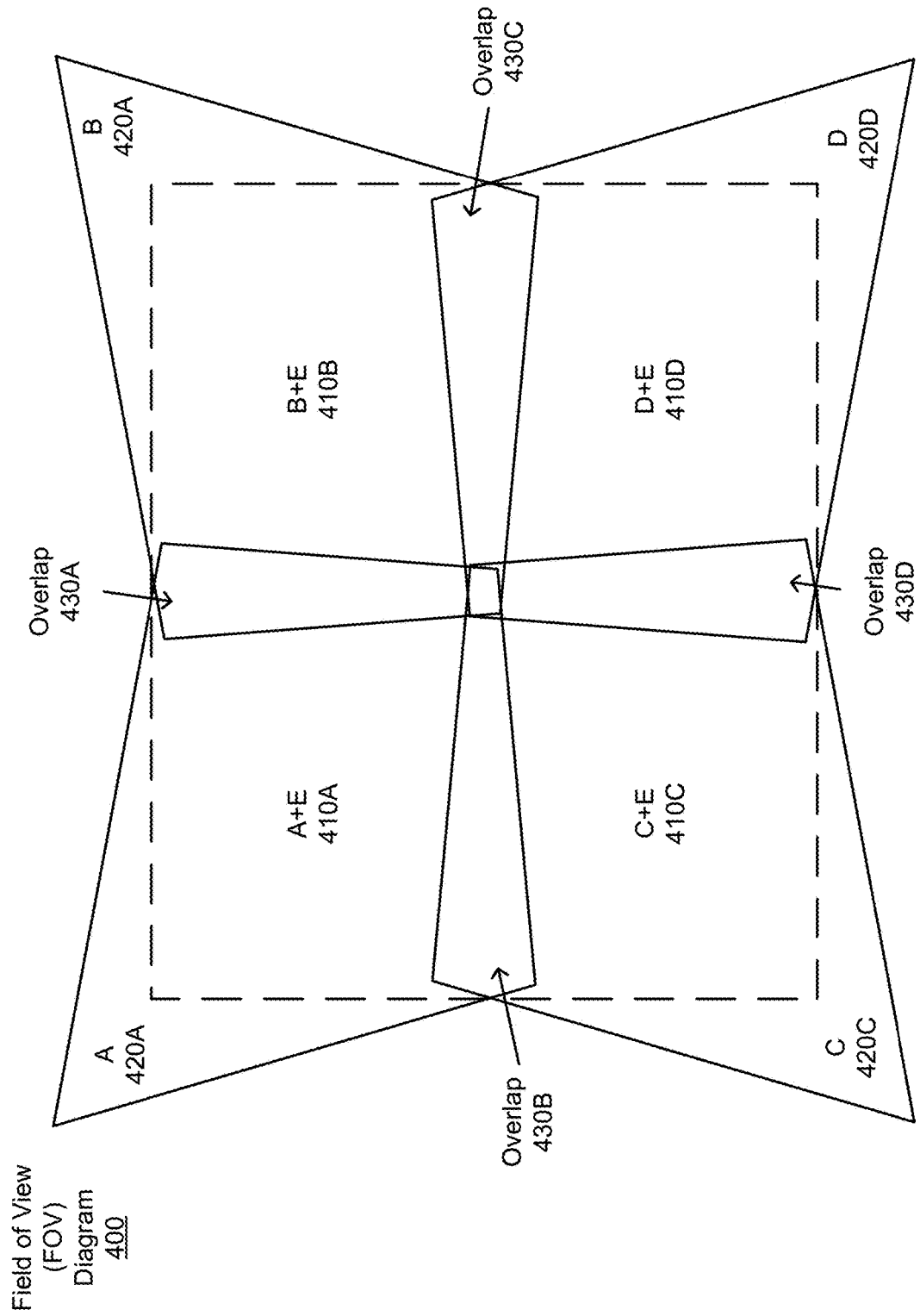
FIG. 4 illustrates a field of view (FOV) diagram showing an exemplary set of overlapping FOVs for the four cameras and the aux camera of the camera array, according to one embodiment.

FIG. 4 illustrates a field of view (FOV) diagram 400 showing an exemplary set of overlapping FOVs for the four cameras 110 and the aux camera 115 of the camera array 120, according to one embodiment.

Each of the four cameras 110 captures a FOV 420. Thus, camera 110A captures the FOV A (420A), camera 110B captures the FOV B (420B), camera 110C captures the FOV C (420C), camera 110D captures the FOV D (420D), and the aux camera 115 captures the FOV E (bounded by the dashed line). Note that the boundaries of the FOVs as illustrated represent the amount of the scene that is captured. Thus, for FOV A (420A), instead of capturing a rectangular image, due to the rotated nature of the camera 110A, the FOV A (420A) is not rectangular and includes an additional portion at the top left that extends beyond the rectangular borders, as well as additional but smaller extensions beyond a rectangular boundary along the other edges of the FOV A (420A). This is because although the imaging sensor for camera 110A is rectangular, due to the rotation of the camera, the FOV changes and is no longer rectangular. This is the same case for the other FOVs generated by the other cameras 110.

Note that each FOV (420) from each camera 110 overlaps with FOVs (420) from adjacent cameras 110. Thus, FOV A (420A) overlaps with FOV B (420B) as indicated at overlap 430B, and the diagram 400 additionally includes overlap 430A (between FOV A and B), overlap 430C (between FOV B and D), and overlap 430D (between FOV C and D). As described below, these overlap portions may be used to stitch together the images captured from these FOVs by the cameras 110.

Additionally, the FOV of the aux camera 115 overlaps with the FOVs of each of the four cameras 110. As the aux camera 115 is not rotated, its FOV E is rectangular, and as shown in the diagram 400, is configured to overlap with a substantial majority (e.g., 90%) of the FOVs of the cameras 110. In particular, the FOVs overlap at FOV A+E 410A, FOV B+E 410B, FOV C+E 410C, and FOV D+E 410D. As described below, the overlapping FOV of the aux camera 115 may be used to provide supplemental information that may be used to improve the stitching of the four images captured by the four cameras 110, and/or to provide additional information for the image, such as depth information. Additionally, as the detail resolving power of the lenses of the cameras 110 may be lower at the edges, the addition of the supplemental information may help to improve the level of detail at the center of the combined FOV of the camera array 120.

In one embodiment, FOV E does not overlap with the FOVs of the other cameras. Instead, the aux camera 115 is configured to capture the same FOV as one of the other cameras 110. This allows the aux camera 115 to capture the same details as one of the other cameras, allowing the aux camera 115 to resolve the same detail at the "sweet spot" of the combined FOV of the camera array 120, as due to the MTF (modulation transfer function) of the lenses on the cameras 110, the detail level that may be resolved at the edges of the lenses of the cameras 110 may be reduced.

Exemplary Stitching Process

Figure 5:
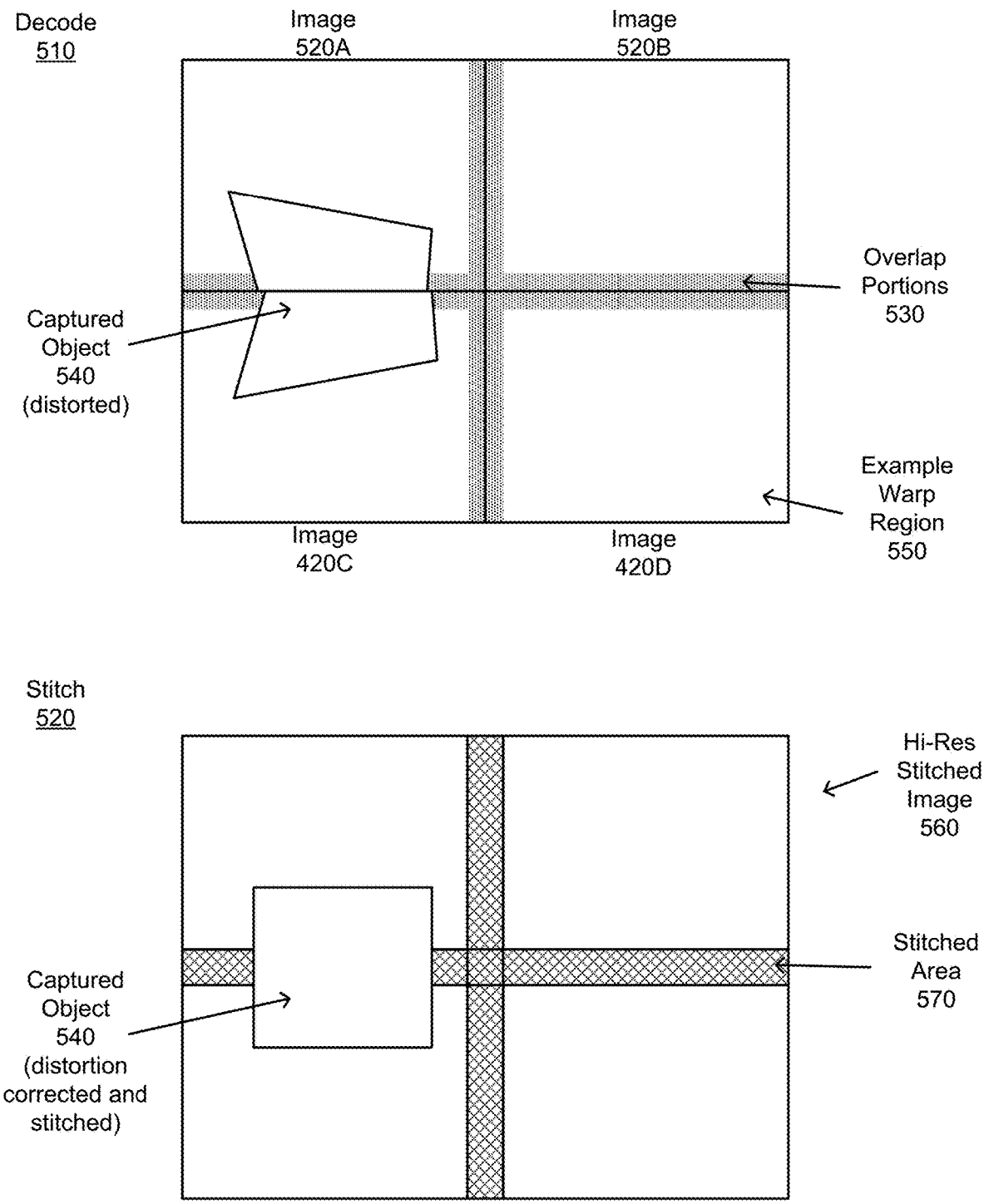
FIG. 5 illustrates an exemplary stitching process for the images captured by the four cameras of the camera array, according to one embodiment.

FIG. 5 illustrates an exemplary stitching process for the images captured by the four cameras 110 of the camera array 120, according to one embodiment. In one embodiment, the process described here may be performed by the stitching module 234 of the image processing system 230.

The images captured by the camera array 120 can vary in distortion and warp based on the camera in the camera array or the position of the camera in the camera array (e.g., roll, pitch, yaw, etc.). Thus, for example, if a camera 110 is a fish eye camera, the captured image has a fish eye distortion. In addition, the overlap portion 430 of one image captured by one camera 110 and the same overlap portion 430 captured by an adjacent camera 110 have FOVs that are angled at different orientations to each other. However, as the FOV is overlapping in the overlap portions 430, common elements in the captured image, are visible in both portions, although the objects may be distorted based on the lens distortion and due to the rotation of the camera 110. Thus, the stitching module 234 may correct for the distortions and use the common elements in the overlap areas between two captured images to align the images for stitching.

In the initial decode 510 operation, the stitching module 234 decodes the four captured images 520A-D and performs an initial warp on the images 520 to correct for basic distortions, such as the rotation and lens distortions described above. As illustrated in the decode 510 operation, the captured object 540, while originally rectangular in shape, is distorted due to the rotation of the FOVs of the cameras 110. As the cameras 110 are rotated by a known amount, the stitching module 234 may perform one or more preconfigured image manipulation operations (e.g., stretching, compressing, warping, transforming, cropping, etc.) on the images 520 in order to correct for the rotated FOV, such that the objects captured in the image appear similar to a captured image where the FOV was not rotated. For example, the example warp region 550 may be stretched. The stitching module 234 also performs various image manipulation operations on the images 520 to correct for known lens distortions and other visual artifacts that are known to occur due to the type of lens, imaging system, and camera position. For example, the stitching module 234 may compress the flat edges of the images 520 while stretching out the corners of the image in order to correct for lens distortions.

In one embodiment, the stitching module 234 receives depth information from the depth module 236 and uses the depth information to more accurately warp the images 520 to adjust for FOV rotation and image distortions. The depth information generated by the depth module 236 is received from the aux camera 115, which, unlike the cameras 110, is not rotated. Thus, the depth information may include a more accurate representation of a non-rotated FOV. This information may be used by the stitching module 234 to determine the correct characteristics of the images 520 if they had been captured with a non-rotated FOV. For example, the depth information may provide details about the appearance and structure of various regions of the images captured by the cameras 110. The stitching module 234 uses the depth information to perform more accurate image manipulation operations on the images 520 captured by the cameras to remove the effects of the rotation and image distortions.

Additional details regarding stitching images are described in U.S. patent application Ser. No. 15/234,869, filed on Aug. 11, 2016, U.S. patent application Ser. No. 14/872,063, filed on Sep. 30, 2015, U.S. patent application Ser. No. 14/872,017, filed on Sep. 30, 2015, U.S. patent application Ser. No. 14/754,694, filed on Jun. 30, 2015, and U.S. patent application Ser. No. 14/308,495, filed on Jun. 18, 2014, all of which are incorporated by reference in their entirety.

Additionally, the depth information may provide the stitching module 234 with information about the 3D structure of the elements in the image 520. This may allow the stitching module 234 to adjust the perspective and orientation of elements in the image 520 in 3D space in order to adjust for the rotation and for image distortions. For example, an image 520 may include a building, and the depth information indicates the 3D structure of the building. Due to the rotation of the FOV of the cameras 110, the perspective and appearance of the building may remain incorrect if only simple image manipulation techniques such as 2D transforms are used. For example, the edges of the building may not be straightened out using the 2D transforms. Instead, the stitching module 234 may use the depth information to create a 3D model of the building, apply the captured image as a texture on the 3D model, and rotate the 3D model to account for the rotation of the FOV of the cameras 110. The rotation of the 3D model to generate a non-rotated view may be more accurate than the simple 2D image transformation techniques. The stitching module 234 may apply this 3D rotation process to all parts of the image or only to those parts with significant differences in depth (e.g., beyond a threshold).

The stitching module 234 also stitches together the four images from the four cameras 110. The stitching module 234 performs a stitching operation 520 on the overlap portions 530 as shown to create a stitched area 570, resulting in a high resolution stitched image 560 that combines the four images of the cameras 110. In the stitching 520 operation, the overlap portions 530 are stitched using one or more stitching algorithms.

In one embodiment, the stitching module 234 uses a depth-based stitching algorithm. In one embodiment, the depth-based stitching algorithm uses the overlapping portions to generate depth information. The depth information may be extracted from the overlapping portions by utilizing the parallax/stereo effect from capturing the overlap portion from the different cameras 110. In another embodiment, the depth-based stitching algorithm also uses the depth information gathered by the aux camera 115, the acquisition of which is described above. The depth information from the aux camera 115 may be used to determine the depth of elements which are near to the camera array 120 and which are in front of the region of overlap of the FOVs of the cameras 110.

The depth information may be used to determine the location of objects in the captured scene by reconstructing the scene (e.g., in three dimensions) using the depth information. Using the reconstructed scene information and the location of objects in the scene, the depth-based stitching algorithm is able to more accurately stitch together the objects in the overlap portions to create a more seamless stitched image at the stitched areas 570.

For example, the stitching module 234 may generate a point cloud based on the acquired depth information. The stitching module 234 uses the point cloud information to identify objects in the captured images at the overlap portions. These objects may have point cloud data that have values that are of a threshold differe7nce from the background average. The image processing system 130 identifies the corresponding objects within both overlap portions of two adjacent images and aligns the overlapping portions using these identified objects to create the fully stitched overlap area. The stitching module 234 may also perform additional image manipulation operations (e.g., stretching) in order to align the elements in one image with the elements in another image.

The stitching module 234 may correspond the objects in the captured images and the objects identified in the point cloud by having knowledge of the approximate location in the captured image where the object should appear, based on the rotational orientation of the cameras. The stitching module 234 may then match the object in the captured image and the object in the point cloud by using edge detection techniques. For some objects in the captured image, only a portion of the edges of an object may be correctly identified. However, the object outline in the point cloud data can help to identify the remaining edges and thus the identification of the edges of an object may help to align the images as described.

Other methods may also be used to stitch the overlap portions or to augment the depth-based stitching process described above. For example, various feature detectors, such as speeded up robust features (SIFT) may be used to detect features in the overlap portions. The features detected in each overlap portion captured by each camera 110 may be matched in an image registration process, using various processes, e.g., random sample consensus (RANSAC). After image registration, calibration may be performed on the overlap portions to reduce differences in the overlap portions caused by the different lenses of the cameras 110. Additional alignment may also be performed to align the two overlap portions. A final blending based on the image registration and calibration information may be performed to fully stitch the overlap portions.

In one embodiment, the stitching module 234 additionally receives object tracking information from the object tracking module 238, and uses this information to perform the stitching. The object tracking information may identify in each captured image the elements in the image and their respective depth value (i.e., z-value). This may be used by the stitching module 234 to distinguish between elements in the image when the depth information is not sufficient to distinguish between elements in the image for the purposes of aligning the elements for stitching. For example, an element may be moving quickly across a scene and be obscured by motion blur, warped by rolling shutter distortions, obscured by another element when it passes an overlapping FOV region of the cameras 110, and so on. By receiving the object tracking information for the element, the stitching module 234 is able to identify and isolate that element from the other elements in the image and perform a more accurate alignment during the stitching process for that element if that element crosses an overlap region.

In one embodiment, the stitching module 234 further corrects for distortions caused by the alignment and stitching process described above. The alignment process may have caused some elements in the scene to be warped such that their appearance no longer reflects their actual appearance. The stitching module 234 may log the image manipulations performed during the stitching process and apply additional image manipulations to the image to adjust for those image manipulations performed during the stitching process that exceed a certain threshold change amount. The additional image manipulations may modify portions of the image which were not manipulated during the stitching process but when modified would make the image portions which were modified during the stitching process appear correct to a viewer. For example, if the stitching module 234 had warped one portion of the image using an image manipulation technique so that elements would align during the stitching process, the stitching module 234 may warp adjacent portions of the same image using the same image manipulation technique but to a lesser amount to create a gradient from the portion of the image with the highest change due to the image manipulation to the portions of the image with no image manipulations applied.

Exemplary Object Tracking and Depth Mapping

Figure 6:
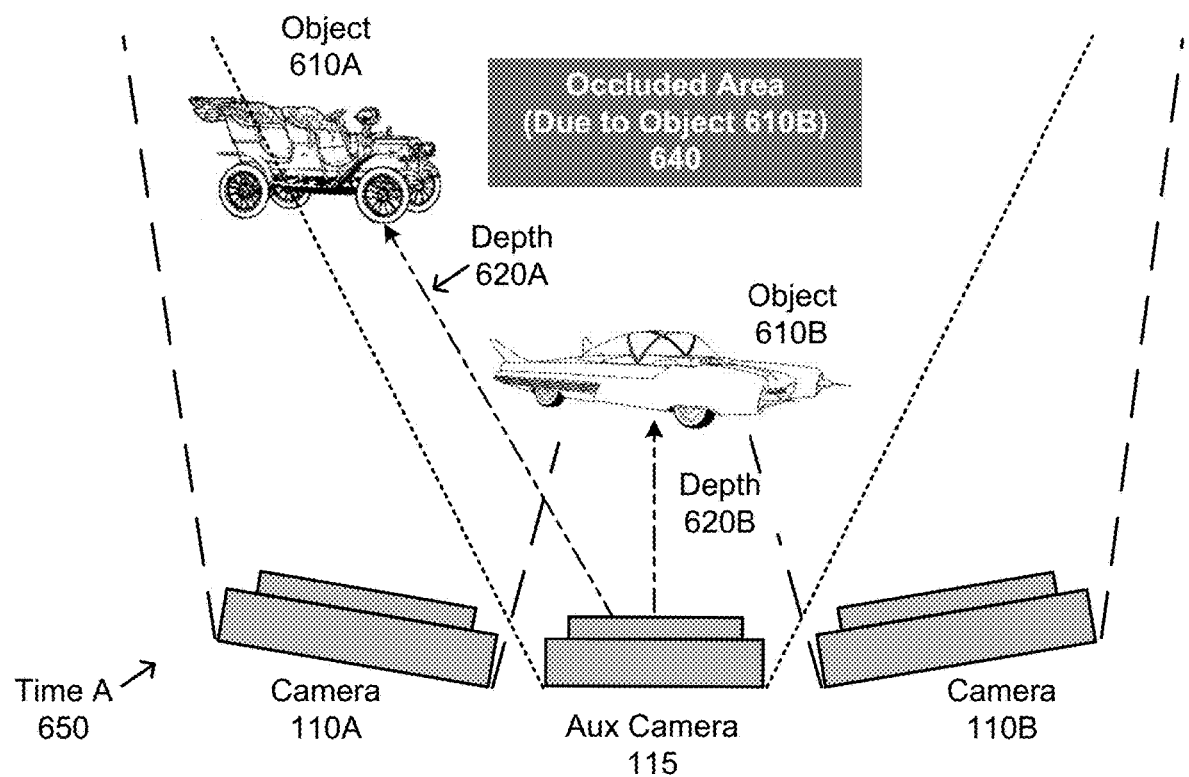
FIG. 6 illustrates exemplary process for object tracking and depth mapping, according to an embodiment.
Figure 6:
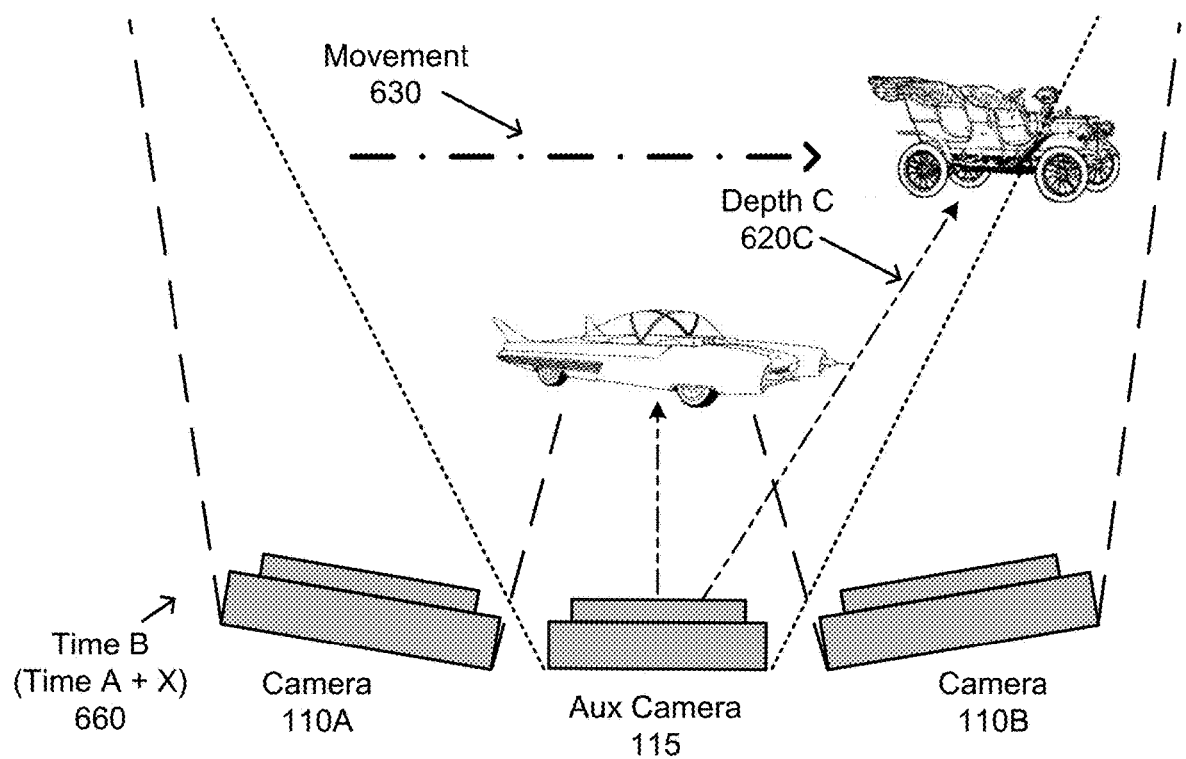

FIG. 6 illustrates exemplary process for object tracking and depth mapping, according to an embodiment. In one embodiment, the object tracking may be performed by the object tracking module 238 of the image processing system 230, and the depth mapping may be performed by the depth module 236 of the image processing system.

Depth Mapping

As noted above, the depth module 236 maps the depth of various elements in the scene captured by the camera array 120 via the aux camera 115. For example, the depth module 236 can determine the depth 620A of object 610A and the depth 620B of object 610B at time A 650 using the depth sensing capabilities of the aux camera 115. Time A 650 may be a single frame in a video captured by the camera array 120. At time B 660, object 610A has moved according to movement 630. Time B is a time after time A, and the separation between time B and A may be a duration X, which may only be a single frame time in difference (e.g., $\frac{1}{30}$ sec for a 30 frames per second video).

Note that the depth module 236 would not be able to accurately determine the depth of the object 610A using the cameras 110 alone as the object 610A is not visible in the overlapping FOV region of the cameras 110, either due another object, such as object 610B, creating an occluded area 640, or due to the speed of the movement 630, which may cause the object 610A to only appear in frame for a short period of time, and thus the object 610A may not appear within the overlapping FOV of the cameras 110. However, with the aux camera 115, the depth module 236 is able to accurately determine the depth of the object 610A.

Using the captured depth information, the depth module 236 may construct a partial 3D reconstruction of the captured scene or video. This 3D reconstruction may be a point cloud indicating the surfaces, edges, and other elements in the scene for which depth information is received. In the case of a video, the depth module 236 may be able to apply additional data to the 3D reconstruction if the camera array 120 is moved around the scene, such as with a rotation. The depth module 236 may use various position sensors of the camera array 120, such as a gyroscope and accelerometer, to estimate the movement of the camera array 120 in space (dead reckoning) and correctly position newly received depth information in an existing 3D reconstruction to compensate for the estimated camera array movement. The depth module 236 may further apply the captured image data from the camera 120 onto the 3D reconstruction as textures in order to create a textured 3D reconstruction of the captured scene. This textured 3D reconstruction may be used in a virtual reality (VR) application, such as with a VR headset or other tool.

In one embodiment, the depth module 236 may request that the camera array 120 be moved horizontally and vertically by some set distance (e.g., 1 foot) while continued to be pointed at the same scene. This allows the aux camera 115 to capture additional depth information for different perspectives of the scene. This additional depth information may be used to create a more complete set of depth information for the captured scene.

Object Tracking

As described above, the object tracking module 238 can track the position of (moving and stationary) objects in 3D space using the aux camera 115. As illustrated in FIG. 6, object 610A moves according to the movement 630 from time A 650 to time B 660. The movement 630 may be fast, and may occur over only a few frames of image capture, or within a single frame, such that after capturing the image at time A 650, the next frame captured by the camera array 120 is at time B 660.

The object tracking module 238 tracks an object in the FOV of the camera array 120 by using the aux camera 115 to determine the depth and 3D structure of the object to be tracked. The object tracking module 238 may also sample the texture and color patterns of an object (e.g., via measurements of colors in the object, contrast differences, brightness of the object), and use this information to track the object in the scene in concert with the depth information.

The object tracking module 238 may analyze a captured image to detect various objects based on differences in depth within the scene (i.e., parts of the scene with similar depth values may be considered to be a single object). The object tracking module 238 analyzes the textures for the object (i.e., the captured image portions that correspond to the object) and groups the 3D structure determined from the depth information of each detected object and texture information for each detected object together. In a second captured image, the object tracking module 238 may analyze the image to determine whether a similar object with similar 3D structure and texture exists in the image. If the 3D structure and texture is similar to the previously tracked object, the object tracking module 238 may determine that the object is the same object that was previously detected. A 3D structure may be similar to another 3D structure when their respective point clouds are similar in structure by a threshold percentage.

The tracking of objects may be used for various applications. For example, object tracking data, especially those that occlude each other over different frames, may be provided to the stitching module 234 to assist in distinguishing different objects from each other for stitching purposes. Object tracking may also be used to determine the position of an object in a captured scene and to have the camera array 120 be rotated or a platform housing the camera array 120 to be moved to follow the object. Object tracking may be used to assist in locking focus on a particular object that is being tracked, or for the use of image stabilization (e.g., by tracking an object the frame can be manipulated to be appear steady).

By tracking objects in a scene, the camera array 120 may also be used for augmented reality, where the location of objects in the FOV of the camera array 120 may be needed for overlaying additional information in the images captured by the camera array 120, or in applications such as virtual reality, in order to align objects in the captured scene with virtual objects in VR.

Exemplary Flows

Figure 7:
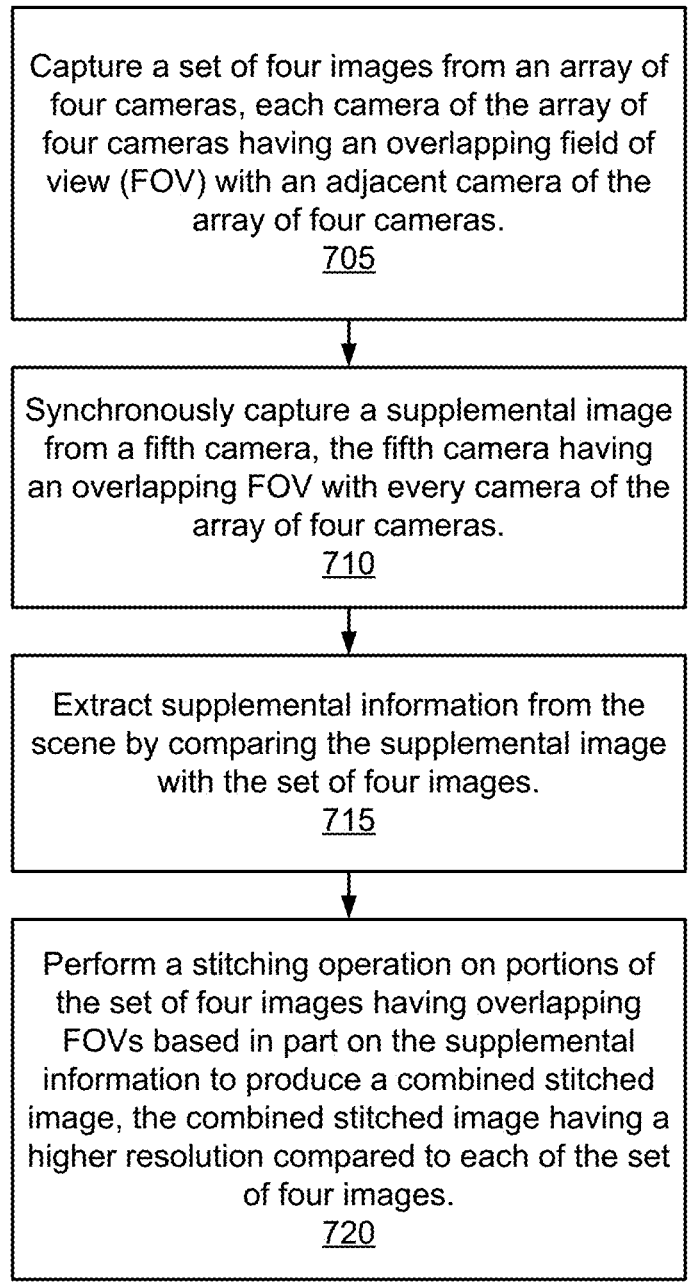
FIG. 7 illustrates a flow for capturing images using four cameras of a camera array with supplemental information from a fifth (aux) camera, according to an embodiment.

FIG. 7 illustrates a flow for capturing images using four cameras of a camera array with supplemental information from a fifth (aux) camera, according to an embodiment. In one embodiment, the operations in the flow described here are performed by the image processing system 130.

Initially, the image processing system 130 captures 705 a set of four images from an array of four cameras. Each camera of the array of four cameras has an overlapping field of view (FOV) with an adjacent camera of the array of four cameras. These cameras may be the cameras 110 described above.

The image processing system 130 synchronously captures 710 a supplemental image from a fifth camera. The fifth camera has an overlapping FOV with every camera of the array of four cameras. In one embodiment, the fifth camera is the aux camera 115 described above.

The image processing system 130 extracts 715 supplemental information from the scene by comparing the supplemental image with the set of four images. This supplemental information may be depth information as described above.

The image processing system 130 performs 720 a stitching operation on portions of the set of four images having overlapping FOVs based in part on the supplemental information to produce a combined stitched image. The supplemental information may be depth information and may be used to create a stitched image with fewer visual artefacts at the points of the stitched image where stitching occurs. The combined stitched image also has a higher resolution compared to each of the set of four images alone.

Additional Configuration Considerations

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for processing image data through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method for capturing images, comprising:
capturing a set of images from a plurality of cameras, each camera of the plurality of cameras having an overlapping field of view (FOV) with an adjacent camera of the plurality of cameras;
synchronously capturing a supplemental image from an additional camera, the additional camera having an at least partially overlapping FOV with the plurality of cameras;
extracting supplemental information by comparing the supplemental image with the set of images; and
stitching portions of the set of images based in part on the supplemental information to produce a combined stitched image, the combined stitched image having a higher resolution than the set of images.

2. The method of claim 1, wherein each camera in the plurality of cameras is rotated by an offset angle from a reference plane, and wherein combined FOVs of the plurality of cameras are greater than an individual FOV of each camera.

3. The method of claim 1, wherein the additional camera is located between the plurality of cameras.

4. The method of claim 1, wherein the additional camera is located external to the plurality of cameras.

5. The method of claim 1, wherein the additional camera is a depth sensing camera.

6. The method of claim 1, wherein the supplemental information includes depth information, and wherein stitching portions of the set of images based in part on the supplemental information comprises:
performing image manipulation operations on the set of images to correct for a corresponding rotated FOV of each camera in the plurality of cameras;
identifying, using the depth information, objects within portions of the set of images corresponding to the overlapping FOVs;
aligning the set of images such that one or more of the identified objects are aligned; and
stitching the aligned set of images to produce the combined stitched image.

7. The method of claim 6, wherein the supplemental information additionally includes object tracking information that indicates a location of objects in a shared FOV of the plurality of cameras, and wherein stitching portions of the set of images based in part on the supplemental information further comprises:
identifying, using the object tracking information, objects within portions of the set of images corresponding to overlapping FOVs of each camera of the plurality of cameras.

8. The method of claim 1, wherein the supplemental information includes depth information, the method further comprising:
generating a three-dimensional (3D) reconstruction of a scene captured by the plurality of cameras using the depth information to produce a 3D model of the scene and using the set of images to texture the 3D model of the scene to produce the 3D reconstruction of the scene.

9. The method of claim 1, wherein the supplemental information includes depth information, the method further comprising:
generating object tracking information based on the depth information, the object tracking information indicating locations of objects in a combined FOV of the plurality of cameras; and
maintaining optical focus on an object in the combined FOV of the plurality of cameras over a plurality of captured images using the object tracking information.

10. The method of claim 1, wherein the additional camera captures video for use as a live video feed.

11. A system comprising:
a plurality of cameras, each camera of the plurality of cameras having an overlapping field of view (FOV) with an adjacent camera of the plurality of cameras, the plurality of cameras configured to capture a set of images;
an additional camera having an at least partially overlapping FOV with the plurality of cameras, the additional camera configured to capture a supplemental image; and
an image processor configured to stitch portions of the set of images based at least in part on supplemental information to produce a combined stitched image, the supplemental information extracted based on the supplemental image, the combined stitched image having a higher resolution than the set of images.

12. The system of claim 11, wherein each camera in the plurality of cameras is rotated by an offset angle from a reference plane, and wherein combined FOVs of the plurality of cameras are greater than an individual FOV of each camera.

13. The system of claim 11, wherein the additional camera is located between the plurality of cameras.

14. The system of claim 11, wherein the additional camera is located external to the plurality of cameras.

15. The system of claim 11, wherein the additional camera is a depth sensing camera.

16. The system of claim 11, wherein the supplemental information includes depth information, and wherein the image processor is further configured to:
perform image manipulation operations on the set of images to correct for a corresponding rotated FOV of each camera in the plurality of cameras;
identify, using the depth information, objects within portions of the set of images corresponding to the overlapping FOVs;

align the set of images such that one or more of the identified objects are aligned; and stitch the aligned set of images to produce the combined stitched image.

17. The system of claim 16, wherein the supplemental information additionally includes object tracking information that indicates a location of objects in a shared FOV of the plurality of cameras, and wherein the image processor is further configured to:

identify, using the object tracking information, objects within portions of the set of images corresponding to overlapping FOVs of each camera of the plurality of cameras.

18. The system of claim 11, wherein the supplemental information includes depth information, and wherein the image processor is further configured to:

generate a three-dimensional (3D) reconstruction of a scene captured by the plurality of cameras using the depth information to produce a 3D model of the scene and using the set of images to texture the 3D model of the scene to produce the 3D reconstruction of the scene.

19. The system of claim 11, wherein the supplemental information includes depth information, and wherein the image processor is further configured to:

generate object tracking information based on the depth information, the object tracking information indicating locations of objects in a combined FOV of the plurality of cameras; and maintain optical focus on an object in the combined FOV of the plurality of cameras over a plurality of captured images using the object tracking information.

20. A system comprising:

at least one camera having an overlapping field of view (FOV) with at least one other camera, the at least one camera configured to capture a set of images and the at least one other camera configured to capture a supplemental image; and an image processor configured to stitch portions of the set of images based at least in part on supplemental information to produce a combined stitched image, the supplemental information extracted based on the supplemental image, the combined stitched image having a higher resolution than the set of images.

* * * * *